(12) United States Patent
Choi et al.

(10) Patent No.: US 8,942,083 B2
(45) Date of Patent: Jan. 27, 2015

(54) APPARATUS AND METHOD FOR TRANSMITTING UPLINK DATA

(71) Applicant: Electronics and Telecommunications Research Institute, Daejeon (KR)

(72) Inventors: Seung Nam Choi, Daejeon (KR); Il Gyu Kim, Chungbuk (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 79 days.

(21) Appl. No.: 13/683,559

(22) Filed: Nov. 21, 2012

(65) Prior Publication Data

US 2013/0135984 A1    May 30, 2013

(30) Foreign Application Priority Data

Nov. 25, 2011   (KR) .................. 10-2011-0124555
Jun. 7, 2012    (KR) .................. 10-2012-0061118

(51) Int. Cl.
*H04W 72/04* (2009.01)
*H04L 5/00* (2006.01)

(52) U.S. Cl.
CPC ............ *H04W 72/04* (2013.01); *H04W 72/042* (2013.01); *H04W 72/0493* (2013.01); *H04L 5/0026* (2013.01); *H04L 5/0048* (2013.01); *H04L 5/0094* (2013.01)
USPC ...................................................... 370/209

(58) Field of Classification Search
CPC ....... H04J 13/18; H04J 13/12; H04J 13/0048; H04J 3/07; H04J 3/073; H04J 3/076; H04B 7/2621; H04B 3/10; H04W 24/00; H04W 84/18; H04W 84/12; H04W 74/04; H04W 88/08; H04W 76/00

USPC ........ 370/209, 252, 329, 336, 344, 470, 491, 370/500, 506
See application file for complete search history.

(56) References Cited

U.S. PATENT DOCUMENTS

| | | | |
|---|---|---|---|
| 2007/0293233 A1* | 12/2007 | Inoue et al. ................ | 455/450 |
| 2009/0046646 A1* | 2/2009 | Cho et al. .................. | 370/329 |
| 2009/0247174 A1* | 10/2009 | Zhang et al. .............. | 455/450 |
| 2010/0081442 A1 | 4/2010 | Kronestedt et al. | |
| 2010/0329220 A1* | 12/2010 | Kim et al. .................. | 370/336 |
| 2011/0235682 A1* | 9/2011 | He et al. .................... | 375/132 |
| 2012/0201149 A1* | 8/2012 | Skarby et al. ............. | 370/252 |

FOREIGN PATENT DOCUMENTS

| | | |
|---|---|---|
| KR | 1020100124000 | 11/2010 |
| KR | 1020110101086 | 9/2011 |

\* cited by examiner

*Primary Examiner* — Kwang B Yao
*Assistant Examiner* — Syed M Bokhari
(74) *Attorney, Agent, or Firm* — Nelson Mullins Riley & Scarborough LLP

(57) ABSTRACT

Disclosed herein relates to a method of transmitting uplink data to increase multiplex capacity. The method includes allocating, by each of a plurality of machine type communication user equipment (MTC UE), position information within a single resource block (RB), which is used when transmitting uplink data, to the single RB, generating information about a demodulation reference signal (DMRS) used when demodulating the data received from the plurality of MTC UE, and transmitting the position information within the RB and the information about the DMRS to each of the plurality of MTC UE.

14 Claims, 17 Drawing Sheets

FIG. 9
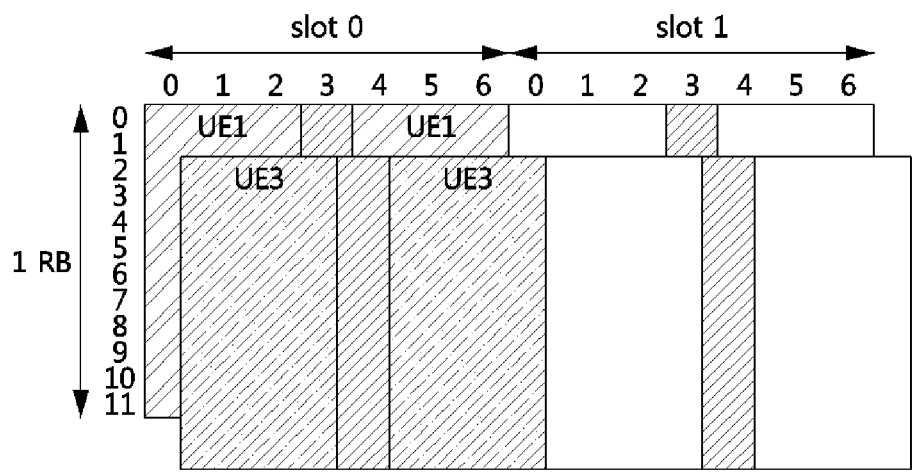
UE1 walsh code [w0 w1] = [1 1]
UE3 walsh code [w0 w1] = [1 -1]
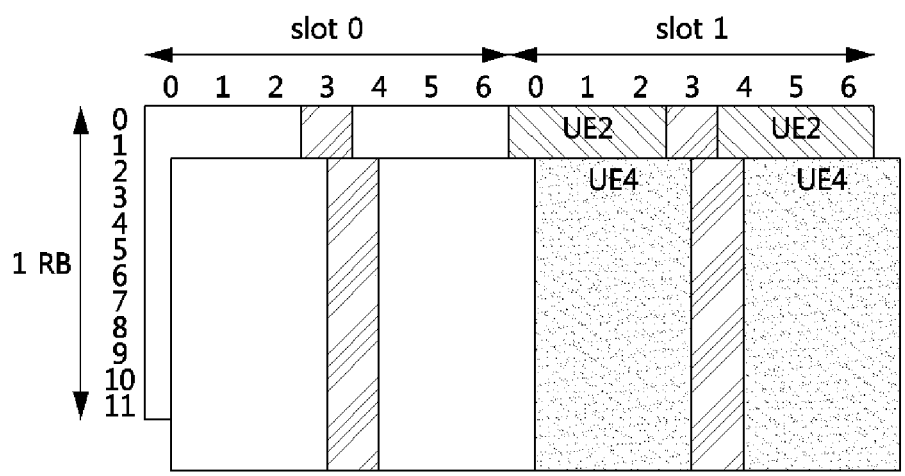
UE2 walsh code [w0 w1] = [1 1]
UE4 walsh code [w0 w1] = [1 -1]

FIG. 10
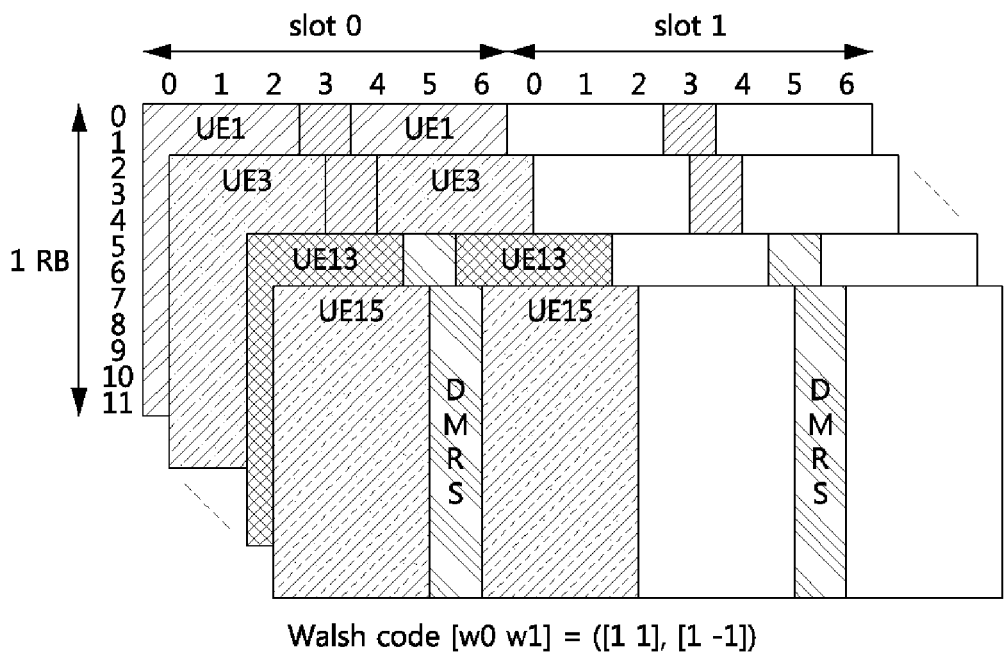
Walsh code [w0 w1] = ([1 1], [1 -1])
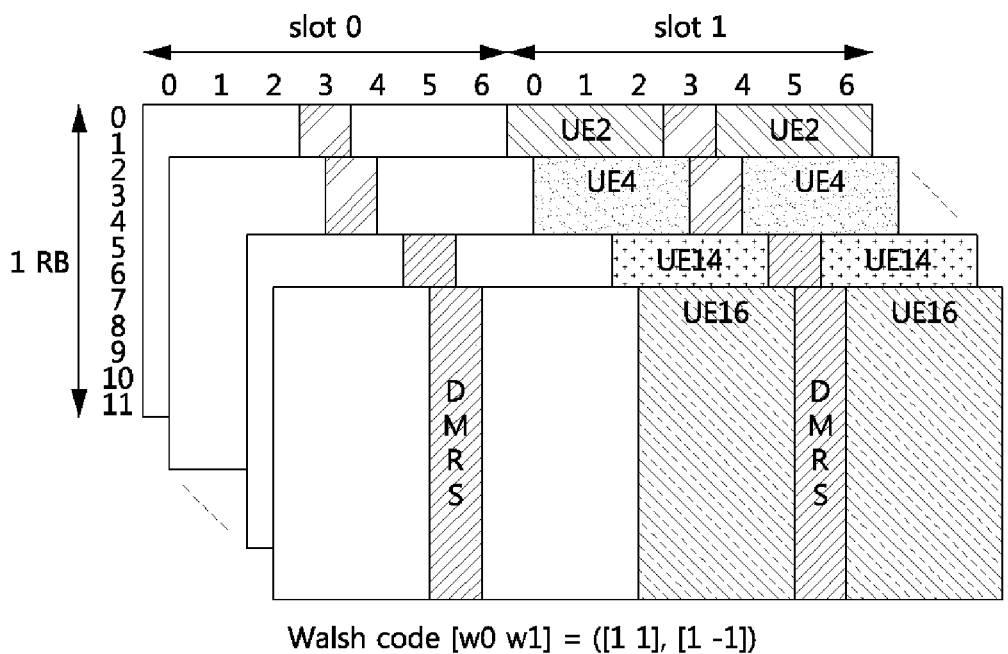
Walsh code [w0 w1] = ([1 1], [1 -1])

| Cyclic Shift Field in uplink-related DCI format | $n^{(2)}_{DMRS,\lambda}$ | | | | $[w^{(\lambda)}(0) \quad w^{(\lambda)}(1)]$ | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 000 | 0 | 6 | 3 | 9 | [1 1] | [1 1] | [1 -1] | [1 -1] |
| 001 | 6 | 0 | 9 | 3 | [1 -1] | [1 -1] | [1 1] | [1 1] |
| 010 | 3 | 9 | 6 | 0 | [1 -1] | [1 -1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 -1] | [1 -1] | [1 -1] | [1 -1] |
| 110 | 10 | 4 | 1 | 7 | [1 -1] | [1 -1] | [1 -1] | [1 -1] |
| 111 | 9 | 3 | 0 | 6 | [1 1] | [1 1] | [1 -1] | [1 -1] |

US 8,942,083 B2

APPARATUS AND METHOD FOR TRANSMITTING UPLINK DATA

CLAIM FOR PRIORITY

This application claims priority to Korean Patent Application No. 10-2011-0124555 filed on Nov. 25, 2011, Korean Patent Application No. 10-2012-0061118 filed on Jun. 7, 2012 in the Korean Intellectual Property Office (KIPO), the entire contents of which are hereby incorporated by reference.

BACKGROUND

1. Technical Field

Example embodiments of the present invention relate in general to machine type communication (MTC), and more specifically, to an apparatus and a method for transmitting uplink data of machine type communication user equipment (MTC UE) that uses a bandwidth of 1.4 MHz (or 3 MHz or 5 MHz) in an MTC system based on 3rd generation partnership project long term evolution (3GPP LTE).

2. Related Art

Machine type communication (MTC) or machine to machine communication denotes a type of data communication associated with at least one entity that does not necessarily require human intervention.

Services that are optimized for MTC are characterized differently from current mobile network communication in that the services are associated with characteristics such as a) a variety of market scenarios, b) data communication, c) lower costs and effort, d) a significantly large number of potential terminals that communicate, and e) a significantly small amount of traffic for each terminal up to a large range.

MTC may be exhibited in the form of various services, and as examples of the various services, smart metering, tracking and tracing, remote maintenance and control, e-Health, and the like may be given.

In current 3rd generation partnership project (3GPP), standardization of MTC is in progress using the term "MTC". Until now, the standardization of MTC has been discussed only in upper layers mainly related to networks and systems, but discussion related to MTC really began even in physical levels starting from the 3GPP standardization meeting in October 2011.

According to long term evolution (LTE) standard, signal bandwidths of 1.4 MHz, 3 MHz, 5 MHz, 10 MHz, 15 MHz, and 20 MHz are supported for communication between an LTE terminal and a base station. The base station uses only one of these bandwidths (for example, 20 MHz), and the LTE terminal should support all bandwidths since the bandwidth that the base station will use for each cell cannot be known.

However, machine type communication user equipment (MTC UE) is expected to be used for transmitting a significantly small amount of information according to applications, and therefore supporting all the bandwidths is exceedingly inefficient in respect of unit cost of the terminal and power consumption. In the current 3GPP standardization meeting, contributions related to MTC UE with a narrow bandwidth of 1.4 MHz have been suggested. That is, even though a bandwidth of the base station is wider than 1.4 MHz, the MTC UE supports only the bandwidth of 1.4 MHz. In addition, in order to transmit data such as moving pictures, even a suggestion such that MTC UE should support a bandwidth of 3 MHz or 5 MHz has been made.

As a representative example of use of MTC applications, smart metering that informs gas usage may be given, and in the smart metering, data transmission rate of MTC is significantly small. Even in the standardization meeting, requirements of MTC UE which should support at least the transmission rate with a lower limit of 118.4 Kbps and with an upper limit of 59.2 Kbps have been determined.

Therefore, since a large number of MTC UE may exist in a single cell, there is a waste problem in terms of frequency resource utilization when a single MTC UE uses overall a single resource block (RB) assigned to the MTC UE having a small transmission rate as described above.

Hereinafter, an LTE terminal denotes a terminal having 3GPP LTE standard that supports all bandwidths of 1.4 MHz, 3 MHz, 5 MHz, 10 MHz, 15 MHz, and 20 MHz, and an MTC UE denotes a terminal that supports bandwidths of 1.4 MHz, 3 MHz, or 5 MHz based on LTE.

SUMMARY

Accordingly, example embodiments of the present invention are provided to substantially obviate one or more problems due to limitations and disadvantages of the related art.

Example embodiments of the present invention provide a method of allocating wireless resources to increase multiplex capacity, Example embodiments of the present invention also provide a method of transmitting uplink data of machine type communication user equipment (MTC UE) to increase multiplex capacity.

Example embodiments of the present invention also provide a base station for increasing multiplex capacity.

Example embodiments of the present invention also provide an MTC UE to increase multiplex capacity.

Example embodiments of the present invention also provide a method for solving a signal collision problem.

In some example embodiments, a method of allocating a wireless resource in a base station includes: allocating, by each of a plurality of machine type communication user equipment (MTC UE), position information within a single resource block (RB), which is used when transmitting uplink data, to the single RB; generating information about a demodulation reference signal (DMRS) used when demodulating the data received from the plurality of MTC UE; and transmitting the position information within the RB and the information about the DMRS to each of the plurality of MTC UE.

In other example embodiments, a method of transmitting uplink data in an MTC UE including: receiving, from a base station, position information within an RB used when transmitting uplink data and information about a DMRS used when demodulating the uplink data; configuring a physical uplink shared channel (PUSCH) using the received position information within the RB and information about the DMRS; and transmitting the configured PUSCH to the base station.

In still other example embodiments, machine type communication user equipment (MTC UE) includes: an information receiving unit that receives, from a base station, position information within an RB used when transmitting uplink data and information about an DMRS used when demodulating the uplink data; a resource mapping unit that maps the data in a data transmission symbol of a PUSCH using the position information within the RB provided from the information receiving unit; a DMRS generating unit that generates a DMRS of the PUSCH using the information about the DMRS provided from the information receiving unit; and a PUSCH transmitting unit that transmits the data mapped by the resource mapping unit and the DMRS generated by the DMRS generating unit.

BRIEF DESCRIPTION OF DRAWINGS

Example embodiments of the present invention will become more apparent by describing in detail example embodiments of the present invention with reference to the accompanying drawings, in which:

FIG. 9 is a drawing showing a structure of a PUSCH with a two-fold increase in the number of MTC UE that may be multiplexed in a single RB using a Walsh code in a case of SU-MIMO according to an embodiment of the present invention;

FIG. 10 is a drawing showing a structure of a PUSCH with an increase in the number of MTC UE that may be multiplexed using eight cyclic shifts (CS) and Walsh codes in a case of MU-MIMO according to an embodiment of the present invention;

DESCRIPTION OF EXAMPLE EMBODIMENTS

Figure 1:
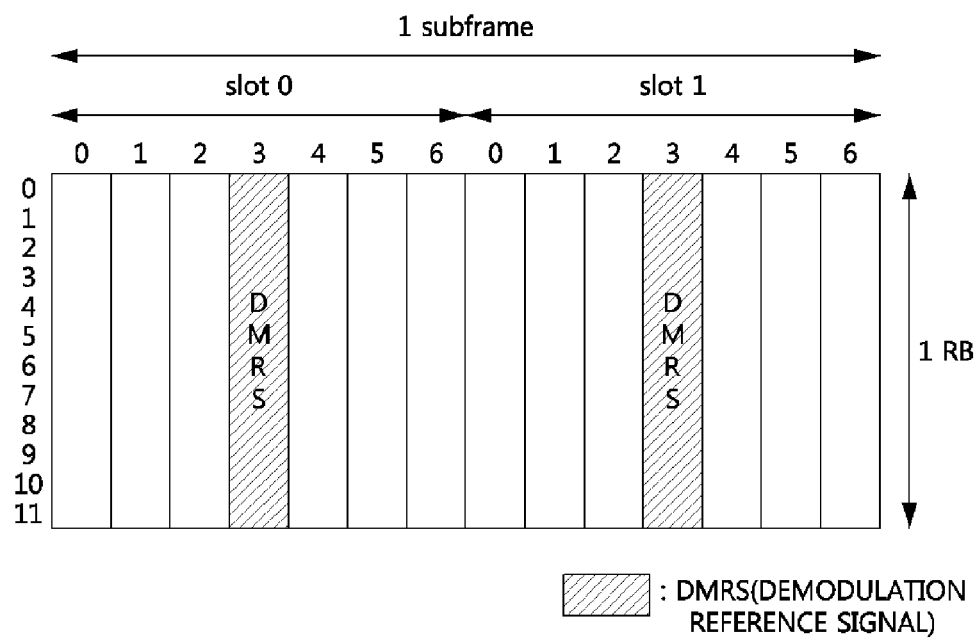
FIG. 1 is a drawing showing a structure of a physical uplink shared channel (PUSCH) that transmits data of a long term evolution (LTE) terminal.

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

It will be understood that, although the terms first, second, A, B, etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Hereinafter, a machine type communication user equipment (MTC UE) or a long term evolution (LTE) terminal may be fixed or have mobility, and may be referred to as other terms such as a mobile station (MS), a user terminal (UT), a subscriber station (SS), a wireless device, and the like. In general, the base station denotes a fixed or moved point that communicates with a terminal, and may be a collective term including a base station, a node-B, an eNode-B, a base transceiver system (BTS), an access point (AP), a relay, a femto-cell, and the like.

Hereinafter, preferred embodiments of the present invention will be described in more detail in reference with the accompanying drawings. Throughout the accompanying drawings, the same reference numerals are used to designate the same or similar components, and redundant descriptions thereof are omitted for easier overall understanding.

Figure 2:
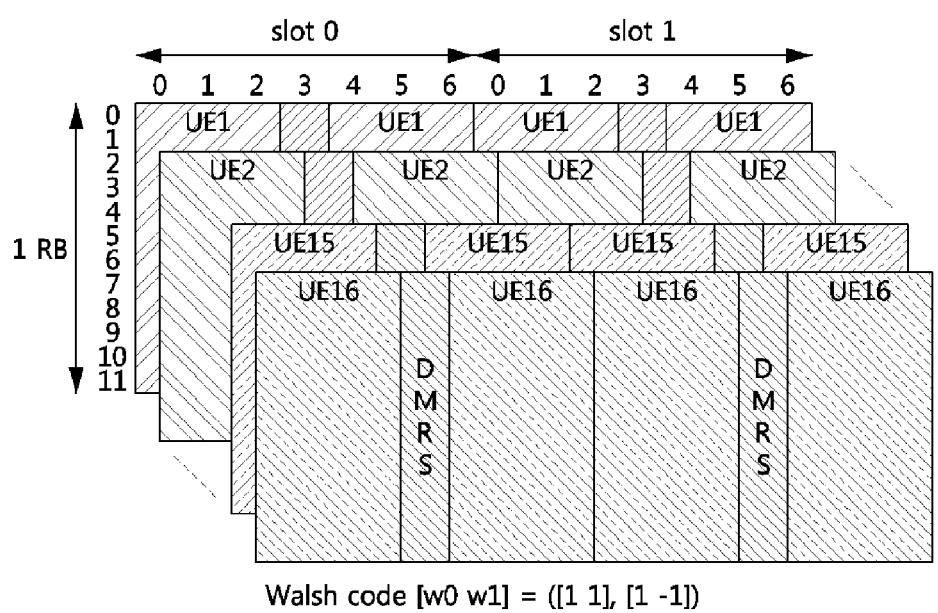
FIG. 2 is a drawing showing the number of LTE terminals that may be multiplexed in a single resource block (RB) in a case of multi-user multi-input multi-output (MU-MIMO)

FIG. 1 is a drawing showing a structure of a physical uplink shared channel (PUSCH) that transmits data of a long term evolution (LTE) terminal, and FIG. 2 is a drawing showing the number of LTE terminals that may be multiplexed in a single resource block (RB) in a case of multi-user multi-input multi-output (MU-MIMO).

Referring to FIGS. 1 and 2, in the structure of the PUSCH that transmits data of an LTE terminal based on 3GPP LTE transmission standards, a single sub-frame of a PUSCH is constituted of two slots in a case of a normal cyclic prefix, and each of the slots is constituted of seven symbols.

In addition, a demodulation reference signal (DMRS) is positioned in a fourth symbol of each slot, and an RB that is a basic unit of frequency resources is constituted of twelve resource elements (REs). Here, the DMRS is one of the pilot signal.

Here, when the structure of the PUSCH is an extended cyclic prefix, a single sub-frame of the PUSCH is constituted of two slots, and each of the slots is constituted of six symbols. In addition, the DMRS is positioned in a third symbol of each slot, and the RB is constituted of twelve REs.

In the above-described structure, an MTC UE is to be allocated with resources in units of RBs from a base station, and is allocated with at least one RB to thereby transmit data to the base station.

When transmitting the PUSCH in MU-MIMO, the DMRS uses eight cyclic shifts (CSs) at a maximum, and orthogonality between the DMRS and other DMRSs is ensured by the CS to thereby reduce interference. Therefore, in the case of the MU-MIMO, eight LTE terminals may be multiplexed in the same RB.

Here, the DMRS is a reference signal for estimating a channel, and is required for coherent-demodulation of a PUSCH in which an uplink-shared channel (UL-SCH) transmission channel is mapped. In addition, the DMRS is also required for coherent-demodulation of a physical uplink control channel (PUCCH) that transmits various types of L1/L2 control signaling.

In addition, when multiplying each DMRS by a Walsh code having a length of 2 ([1 1], [1 −1]) even though the DMRS is the same due to the use of the same CS, orthogonality between LTE terminals is ensured, and the number of LTE terminals which can be multiplexed in a single RB is doubled, resulting in a total of sixteen LTE terminals.

Hereinafter, a method in which a single RB is divided and used by a plurality of MTC UE will be described separately in cases of single user multi-input multi-output (SU-MIMO) and multi-user multi-input multi-output (MU-MIMO).

First, in the case of SU-MIMO, the method in which the single RB is used by the plurality of MTC UE will be described.

Figure 3:
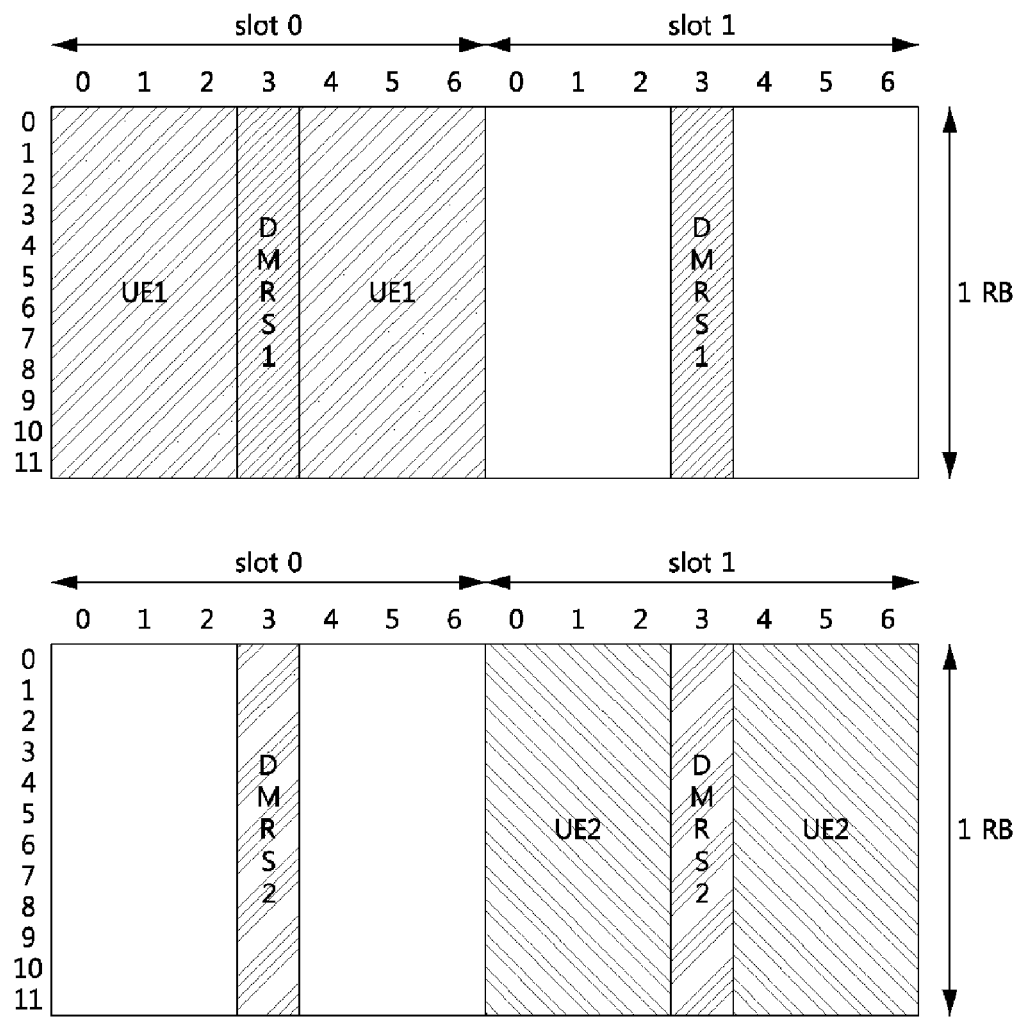
FIG. 3 is a drawing showing a structure of a PUSCH with respect to two machine type communication user equipment (MTC UE) that may be multiplexed in a single RB by performing time division in a case of single user multi-input multi-output (SU-MIMO) according to an embodiment of the present invention.

FIG. 3 is a drawing showing a structure of a PUSCH with respect to two MTC UE that may be multiplexed in a single RB by performing time division in a case of SU-MIMO according to an embodiment of the present invention.

Referring to FIG. 3, a single RB is time-divided by two MTC UE (UE1 and UE2) to thereby map resources. The first MTC UE (UE1) maps the resource in a slot 1, and the second MTC UE (UE2) maps the resource in the slot 1.

In addition, in order to distinguish the first MTC UE (UE1) and the second MTC UE (UE2), DMRSs (DMRS 1 and DMRS 2) that are defined by mutually different CSs may be used.

Here, orthogonality between the first DMRS (DMRS 1) and the second DMRS (DMRS 2) which are defined by the mutually different CSs, is ensured to reduce interference, and two terminals may be multiplexed in a single RB.

Figure 4:
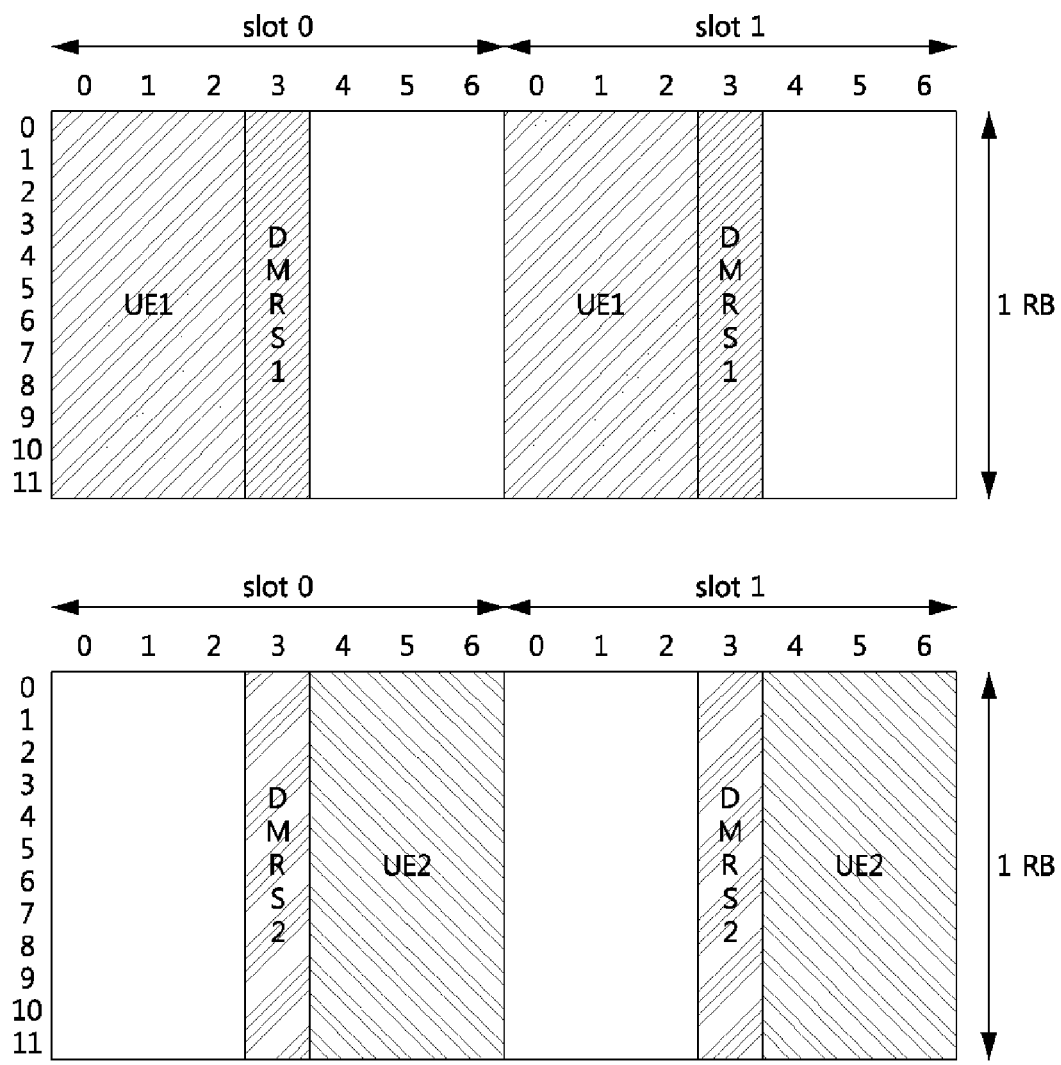
FIG. 4 is a drawing showing a structure of a PUSCH with respect to two MTC UE that may be multiplexed in a single RB by performing time division in a case of SU-MIMO according to another embodiment of the present invention.

FIG. 4 is a drawing showing a structure of a PUSCH with respect to two MTC UE that may be multiplexed in a single RB by performing time division in a case of SU-MIMO according to another embodiment of the present invention.

Referring to FIG. 4, when a single RB is time-divided by two MTC UE (UE1 and UE2) to thereby map resources, positions where each MTC UE maps the resources in a single RB may be differently allocated.

Specifically, the first MTC UE (UE1) maps the resources in symbols 0, 1, and 2 of a slot 0, and the second MTC UE (UE2) maps the resources in symbols 4, 5, and 6 of a slot 1.

In order to distinguish the first MTC UE (UE1) and the second MTC UE (UE2), the DMRSs (DMRS 1 and DMRS 2) that are defined by mutually different CSs may be used.

In the related art, a single UE is allocated with at least one RB, resources are mapped in the allocated at least one RB, and then the RB in which the resource is mapped is transmitted to a base station. However, according to an embodiment of the present invention, a single RB is time-divided by the two MTC UE, resources are mapped in a part of the RB, and then the RB in which the resources are mapped is transmitted to the base station.

Since each MTC UE has a small transmission rate, a larger number of MTC UE may be multiplexed in the single RB using characteristics of the MTC UE. In addition, compared to when a single UE transmits data using both slots, interference due to signals of other UE may be eliminated.

Figure 5:
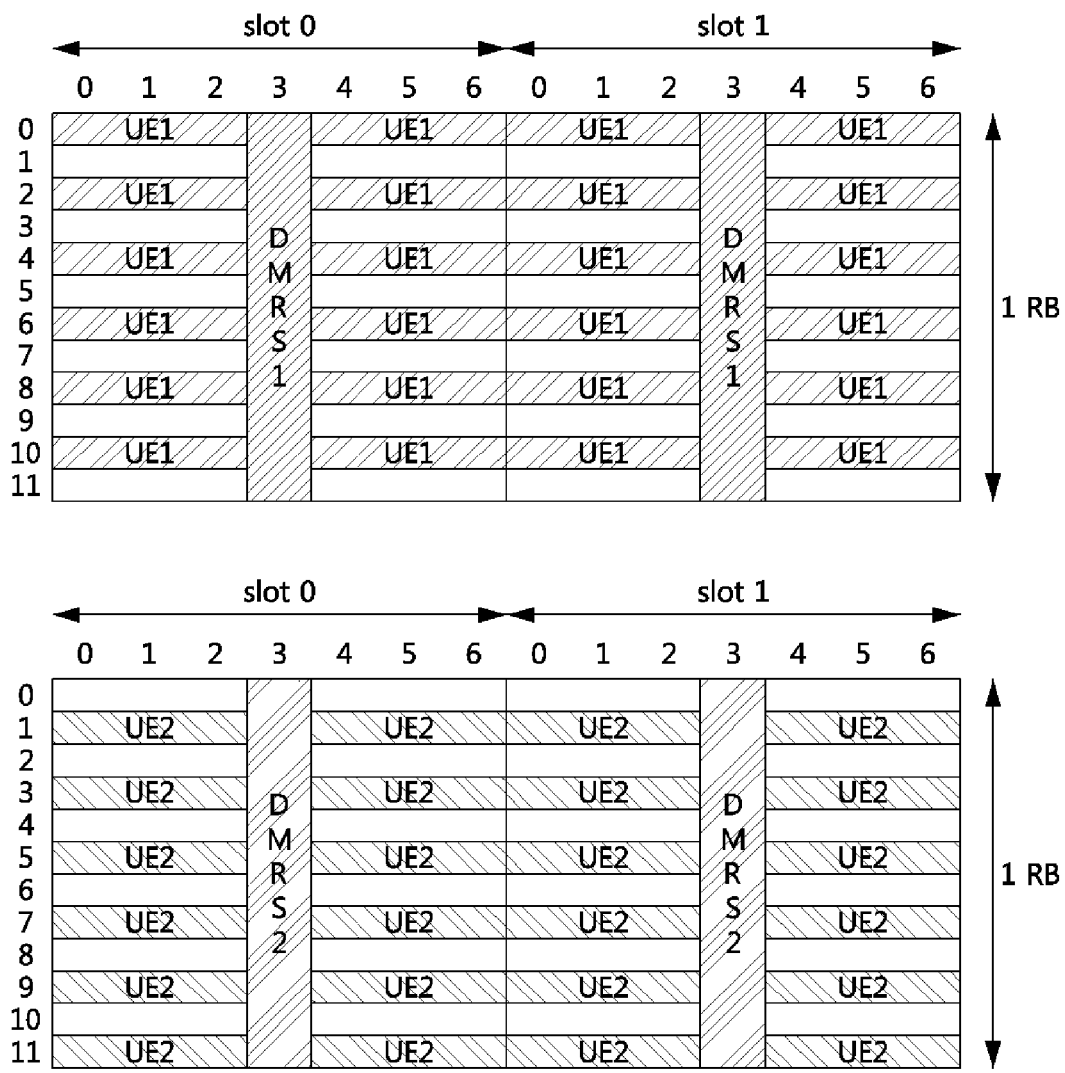
FIG. 5 is a drawing showing a structure of a PUSCH with respect to two MTC UE that may be multiplexed in a single RB by performing frequency division in a case of SU-MIMO according to an embodiment of the present invention.

FIG. 5 is a drawing showing a structure of a PUSCH with respect to two MTC UE that may be multiplexed in a single RB by performing frequency division in a case of SU-MIMO according to an embodiment of the present invention.

Referring to FIG. 5, a single RB is frequency-divided by two MTC UE (UE1 and UE2) to thereby map resources.

The first MTC UE (UE1) maps resources in subcarriers 0, 2, 4, 6, 8, and 10, and the second MTC UE (UE2) maps resources in subcarriers 1, 3, 5, 7, 9, and 11.

Here, in order to distinguish the first MTC UE (UE1) and the second MTC UE (UE2), DMRSs (DMRS 1 and DMRS 2) that are defined by mutually different CSs may be used.

Figure 6:
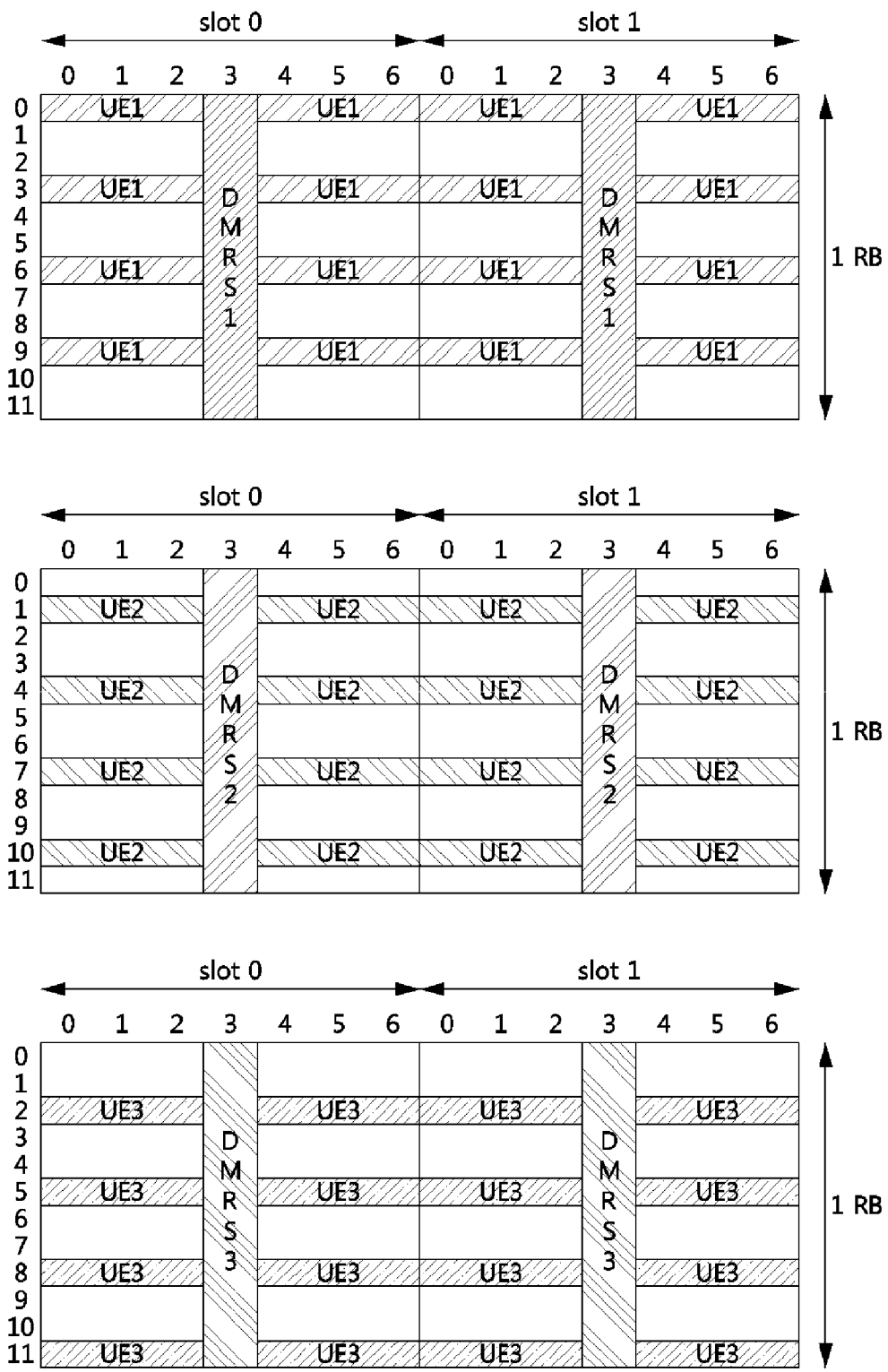
FIG. 6 is a drawing showing a structure of a PUSCH with respect to three MTC UE that may be multiplexed in a single RB by performing frequency division in a case of SU-MIMO according to an embodiment of the present invention.

FIG. 6 is a drawing showing a structure of a PUSCH with respect to three MTC UE that may be multiplexed in a single RB by performing frequency division in a case of SU-MIMO according to an embodiment of the present invention.

Referring to FIG. 6, when a single RB is frequency-divided by three MTC UE (UE1, UE2, and UE3) to thereby map resources, positions of resources to be transmitted by each MTC UE are differently mapped.

The first MTC UE (UE1) maps resources in subcarriers 0, 3, 6, and 9, and the second MTC UE (UE2) may map resources in subcarriers 1, 4, 7, and 10. In addition, the third MTC UE (UE3) may map resources in subcarriers 2, 5, 8, and 11.

Here, in order to distinguish the first MTC UE (UE1), the second MTC UE (UE2), and the third MTC UE (UE3), DMRSs (DMRS 1, DMRS 2, and DMRS 3) that are defined by mutually different CSs may be used.

Figure 7:
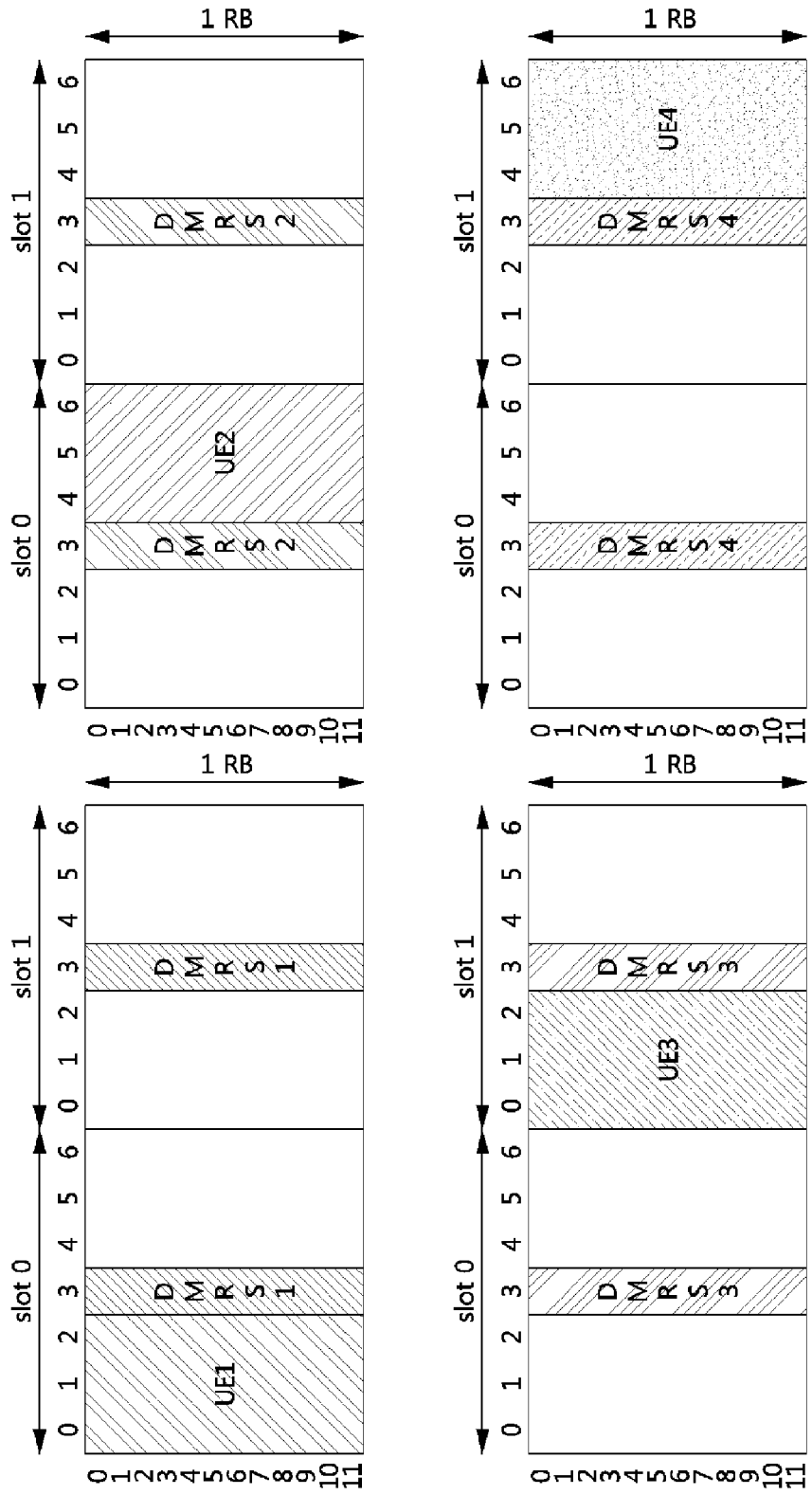
FIG. 7 is a drawing showing a structure of a PUSCH with respect to four MTC UE that may be multiplexed in a single RB by performing time division in a case of SU-MIMO according to an embodiment of the present invention.

FIG. 7 is a drawing showing a structure of a PUSCH with respect to four MTC UE that may be multiplexed in a single RB by performing time division in a case of SU-MIMO according to an embodiment of the present invention.

Referring to FIG. 7, a single RB is time-divided by four MTC UE (UE1, UE2, UE3, and UE4) to thereby map resources. The first MTC UE (UE1) maps resources in symbols 0, 1, and 2 of a slot 1, and the second MTC UE (UE2) maps resources in symbols 4, 5, and 6 of the slot 0. In addition, the third MTC UE (UE3) maps resources in symbols 0, 1, and 2 of a slot 1, and the fourth MTC UE (UE4) maps resources in symbols 4, 5, and 6 of the slot 1.

Here, in order to distinguish the first to fourth MTC UE (UE1 to UE4), DMRSs (DMRS 1, DMRS 2, DMRS 3, and DMRS 4) that are defined by mutually different CSs may be used.

Figure 8:
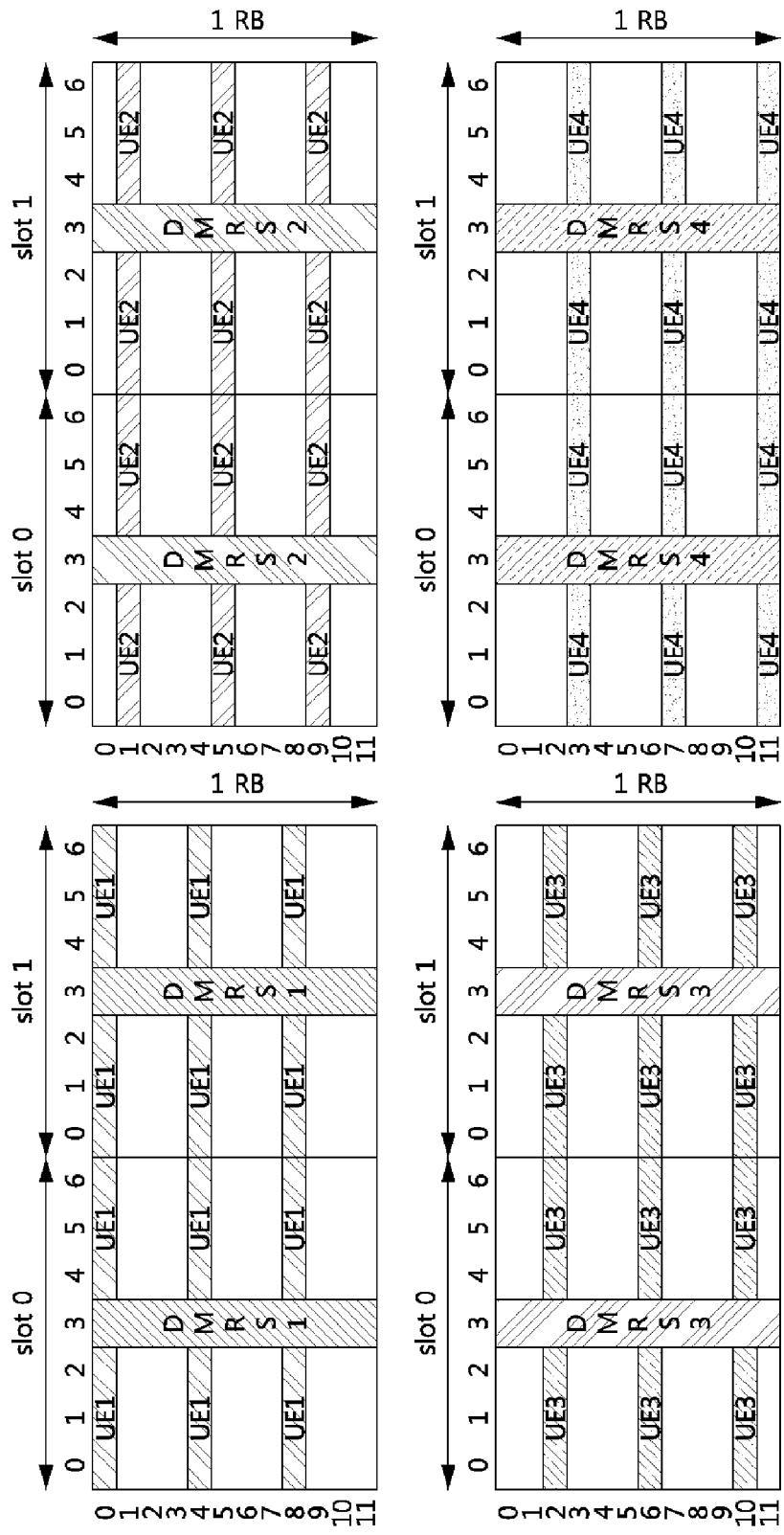
FIG. 8 is a drawing showing a structure of a PUSCH with respect to four MTC UE that may be multiplexed in a single RB by performing frequency division in a case of SU-MIMO according to an embodiment of the present invention.

FIG. 8 is a drawing showing a structure of a PUSCH with respect to four MTC UE that may be multiplexed in a single RB by performing frequency division in a case of an SU-MIMO according to an embodiment of the present invention.

Referring to FIG. 8, a single RB is frequency-divided by four MTC UE (UE1, UE2, UE3, and UE4) to thereby map resources. The first MTC UE (UE1) maps resources in subcarriers 0, 4, and 8, and the second MTC UE (UE2) maps resources in subcarriers 1, 5, and 9.

In addition, the third MTC UE (UE3) maps resources in subcarriers 2, 6, and 10, and the fourth MTC UE (UE4) maps resources in subcarriers 3, 7, and 11.

Here, in order to distinguish the first to fourth MTC UE (UE1 to UE4), DMRSs (DMRS 1, DMRS 2, DMRS 3, and DMRS 4) that are defined by mutually different CSs may be used.

According to an embodiment of the present invention, the transmission rate of each MTC UE is reduced, but the number of MTC UE that can be multiplexed in a single RB is increased. In addition, compared to when a single UE transmits data using both slots, interference due to signals of other UE may be eliminated.

FIG. 9 is a drawing showing a structure of a PUSCH with a two-fold increase in the number of MTC UE that may be multiplexed in a single RB using a Walsh code in a case of SU-MIMO according to an embodiment of the present invention.

Referring to FIG. 9, a DMRS that is defined by the same CS is used in the case of SU-MIMO, but, when a Walsh code is used, the first MTC UE (UE 1) may be distinguished from the third MTC UE (UE 3), and the second MTC UE (UE2) may be distinguished from the fourth MTC UE (UE4).

Therefore, the number of MTC UE that can be multiplexed in a single RB is doubled resulting in a total of four MTC UE.

As described above, a method in which the capacity of the UE that can be multiplexed in a single RB is additionally increased using the Walsh code even though the same DMRS is used, may be applied equally to FIGS. 3 to 8.

Hereinafter, in the case of MU-MIMO, a method in which a single RB is used by a plurality of MTC UE will be described.

FIG. 10 is a drawing showing a structure of a PUSCH with an increase in the number of MTC UE that may be multiplexed using eight CSs and Walsh codes in a case of MU-MIMO according to an embodiment of the present invention.

Referring to FIG. 10, a maximum of eight CSs may be used in the case of MU-MIMO, and therefore eight MTC UE may be multiplexed in a single RB using DMRSs that are defined by mutually different CSs.

In addition, when multiplying the DMRS by the Walsh codes, orthogonality between MTC UE using a DMRS defined by the same CS is ensured, and therefore the corresponding MTC UE may be distinguished from other MTC UE even though the DMRS is the same. Therefore, the number of MTC UE that are multiplexed in a single RB is doubled resulting in a total of sixteen MTC UE.

Here, when comparing FIG. 10 and FIG. 2, the number of MTC UE which are multiplexed in a single RB is sixteen, which is the same, and transmission rate transmitted to the base station by the MTC UE is reduced in half, and therefore interference due to signals of other UE may be reduced compared to when data is transmitted to the base station using both a single RB or a single sub-frame.

Figure 11:
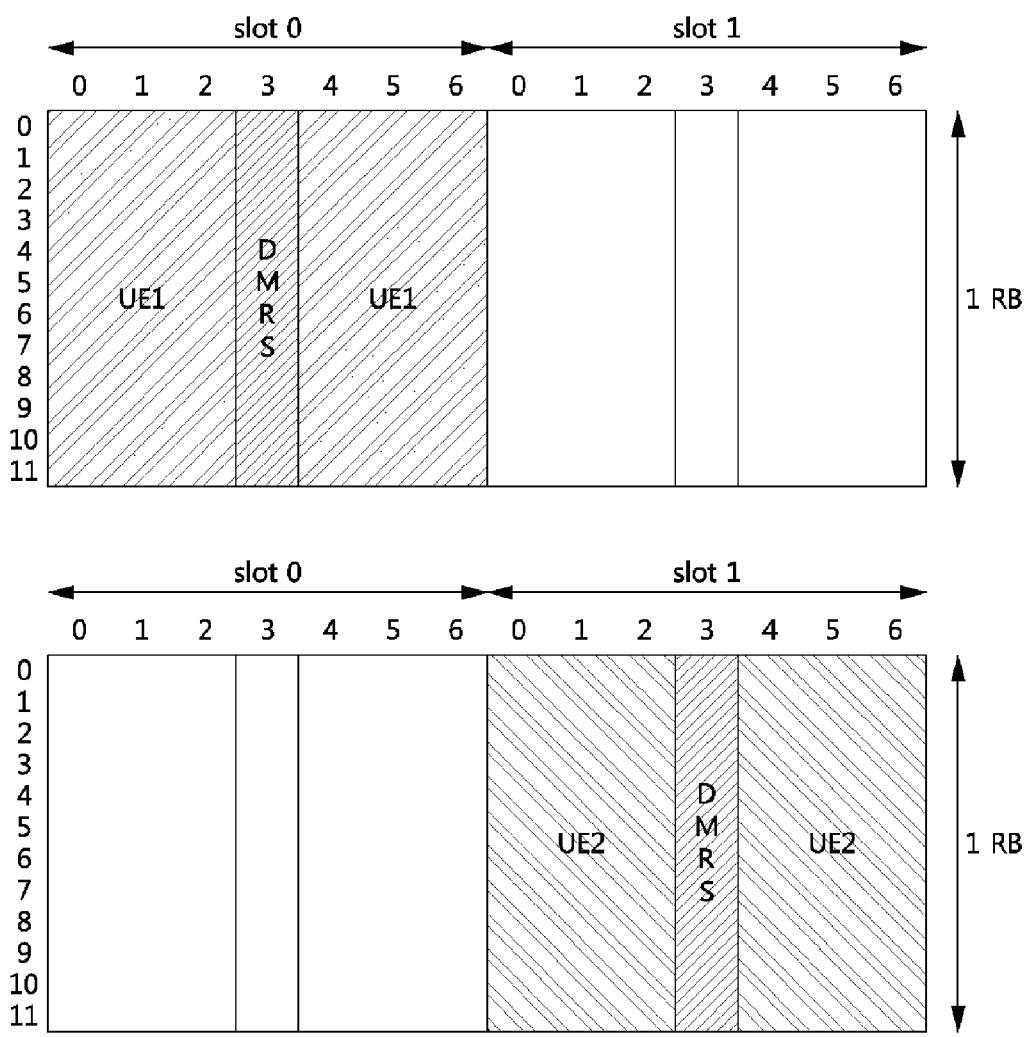
FIG. 11 is a drawing showing a structure of a PUSCH in which two MTC UE are multiplexed in a single RB using a single demodulation reference signal (DMRS) in a case of MU-MIMO according to an embodiment of the present invention.

FIG. 11 is a drawing showing a structure of a PUSCH in which two MTC UE are multiplexed in a single RB using a single DMRS in a case of MU-MIMO according to an embodiment of the present invention.

Referring to FIG. 11, the first MTC UE (UE1) uses a DMRS in a symbol 3 of a slot 0, and transmits data to the slot 0. In addition, the second MTC terminal (UE2) uses a DMRS in a symbol 3 of the slot 1, and transmits data to the slot 1.

Here, in the first MTC UE (UE1) and the second MTC UE (UE2), the DMRSs are not duplicated in a time region, and therefore the DMRSs which are defined by the same CS may be used.

According to the method of multiplexing a plurality of MTC UE in a single RB using the single DMRS of FIG. 11, the number of MTC UE that can be multiplexed is increased to sixteen. However, since only the single DMRS is used in this method, an increase in multiplex capacity by the Walsh code is difficult.

Figure 12:
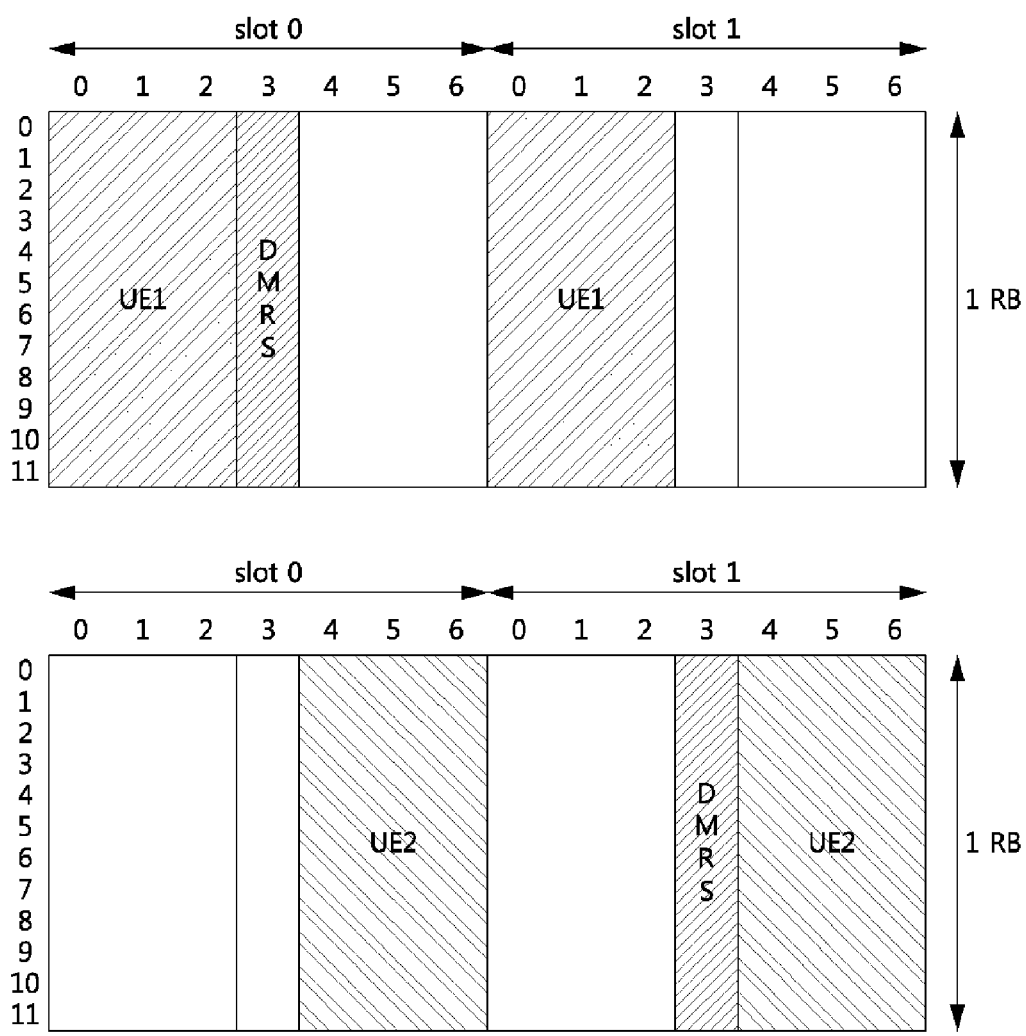
FIG. 12 is a drawing showing a structure of a PUSCH in which two MTC UE are multiplexed in a single RB using a single DMRS in a case of MU-MIMO according to another embodiment of the present invention.

FIG. 12 is a drawing showing a structure of a PUSCH in which two MTC UE are multiplexed in a single RB using a single DMRS in a case of MU-MIMO according to another embodiment of the present invention.

Referring to FIG. 12, the first MTC UE (UE1) uses DMRSs in a symbol 3 of a slot 0, and transmits data to symbols 0, 1, and 2 of the slot 0, and symbols 0, 1, and 2 of the slot 1. In addition, the second MTC UE (UE2) uses DMRSs in a symbol 3 of a slot 1 and transmits data to symbols 4, 5, and 6 of a slot 0, and symbols 4, 5, and 6 of the slot 1.

Here, in the first MTC UE (UE1) and the second MTC UE (UE2), the DMRSs are not duplicated in a time region, and therefore the DMRS that is defined by the same CS may be used.

According to the method of multiplexing a plurality of MTC UE in a single RB using the single DMRS of FIG. 12, the number of MTC UE that can be multiplexed is increased to sixteen. However, since only the single DMRS is used in this method, an increase in multiplex capacity by the Walsh code is difficult.

Figure 13:
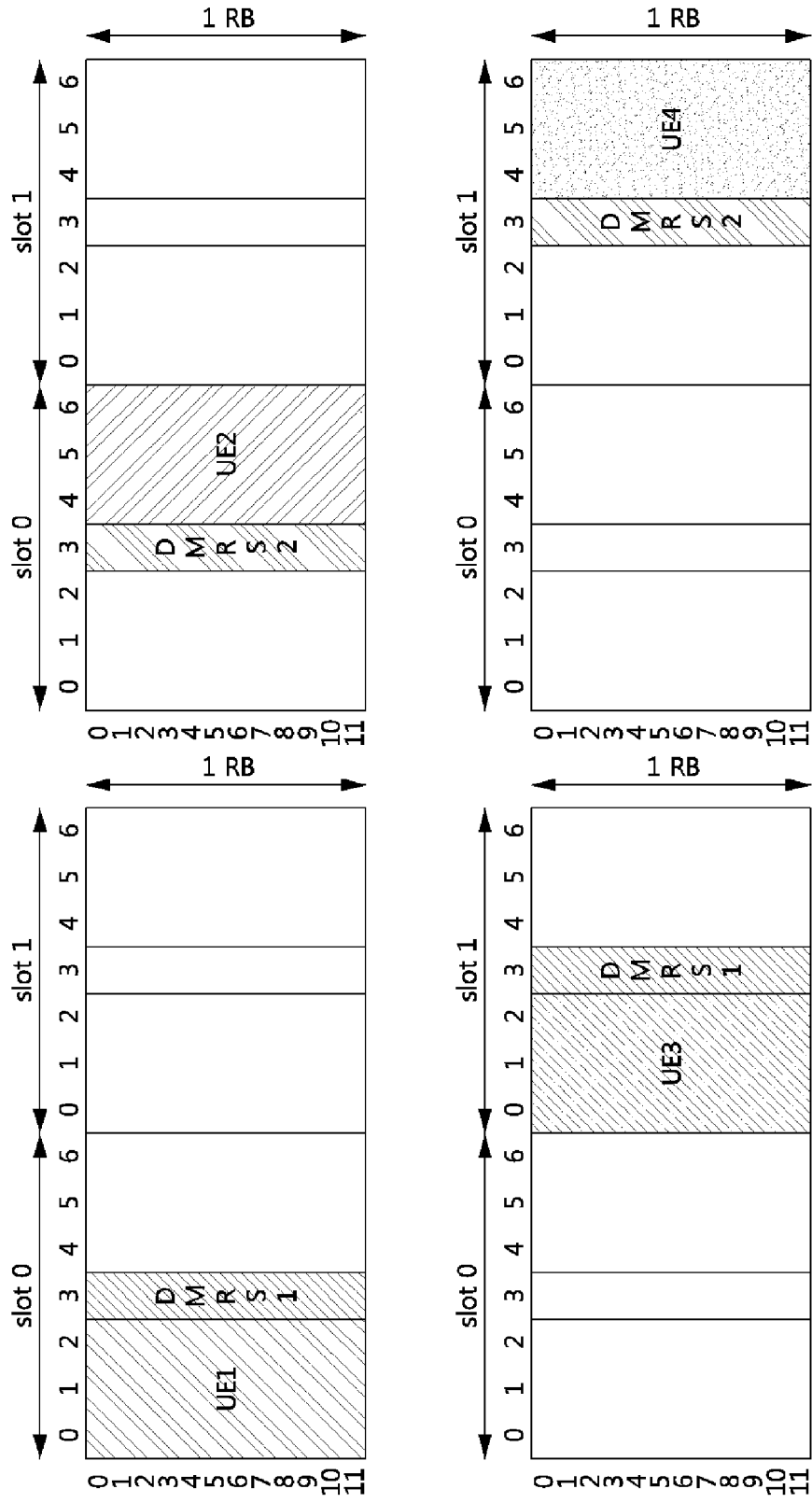
FIG. 13 a drawing showing a structure of a PUSCH in which four MTC UE are multiplexed in a single RB using a single DMRS in a case of MU-MIMO according to an embodiment of the present invention.

FIG. 13 a drawing showing a structure of a PUSCH in which four MTC UE are multiplexed in a single RB using a single DMRS in a case of MU-MIMO according to an embodiment of the present invention.

Referring to FIG. 13, four MTC UE are multiplexed in a single RB, and a data region used by each MTC UE is divided so as not to be duplicated in a time region. In addition, when the DMRSs are not duplicated in the time region, the DMRS that is defined by the same CS is used, and when the DMRSs are duplicated in the time region, the DMRSs that are defined by mutually different CSs are used.

Specifically, the first MTC UE (UE1) may map resources in symbols 0, 1, and 2 of a slot 0, the second MTC UE (UE2) may map resources in symbols 4, 5, and 6 of the slot 0, the third MTC UE (UE3) may map resources in symbols 0, 1, and 2 of a slot 1, and the fourth MTC UE (UE4) may map resources in symbols 4, 5, and 6 of the slot 1.

Here, between the first MTC UE (UE1) and the second MTC UE (UE2), and between the third MTC UE (UE3) and the fourth MTC UE (UE4), the DMRSs are duplicated in the time region, and therefore the DMRSs defined by mutually different CSs are used.

Figure 14:
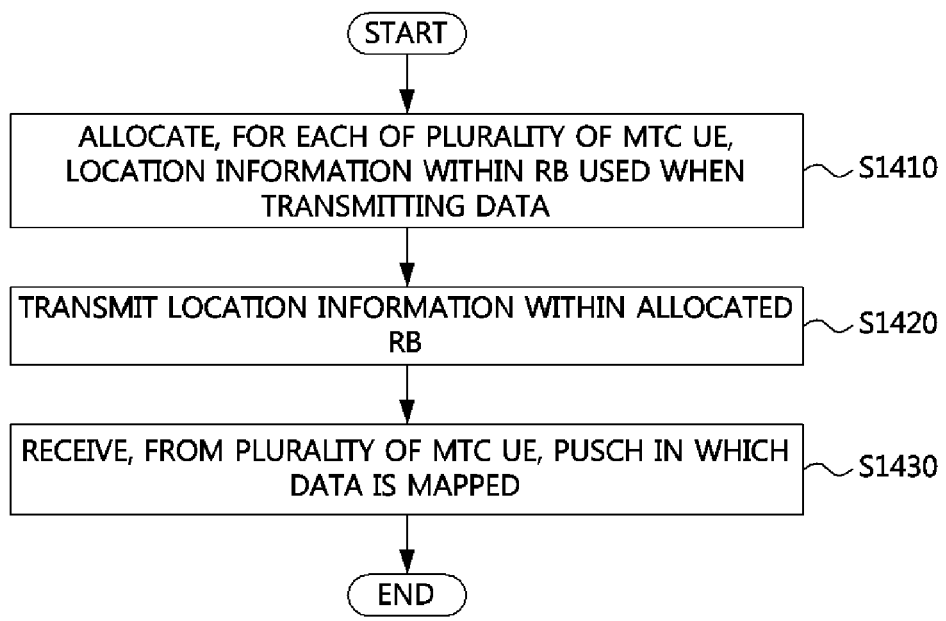
FIG. 14 is a flowchart showing a method of allocating a wireless resource in a base station in order to multiplex a plurality of MTC UE according to an embodiment of the present invention.

FIG. 14 is a flowchart showing a method of allocating a wireless resource in a base station in order to multiplex a plurality of MTC UE according to an embodiment of the present invention.

Referring to FIG. 14, in a method of allocating wireless resources in a base station in order to multiplex a plurality of MTC UE according to an embodiment of the present invention, in step S1410, position information within an RB, which is to be used when transmitting data, is allocated to the single RB by each of the plurality of MTC UE.

Specifically, in step S1410, a base station allocates a CS field in a format of Downlink Control Information (DCI).

Here, control information that is transmitted through a PUSCH is referred to as "DCI". The DCI includes uplink scheduling information, downlink scheduling information, system information, uplink power control command information, control information for paging, control information for instructing a random access channel (RACH) response, and the like.

As examples of the format of DCI, a format 0 for scheduling a PUSCH, a format 1 for scheduling a single downlink-shared channel (PDSCH) codeword, a format 1A for compact-scheduling a single PDSCH codeword, a format 1B for compact-scheduling rank-1 transmission of a single codeword in a spatial multiplexing mode, a format 1C for significantly compact-scheduling a downlink-shared channel (DL-SCH), a format 1D for scheduling a PDSCH in a multi-user spatial multiplexing mode, a format 2 for scheduling a PDSCH in a closed loop spatial multiplexing mode, a format 2A for scheduling a PDSCH in an open loop spatial multiplexing mode, a format 3 for transmitting a transmission power control (TPC) command of a 2 bit-power control for physical uplink-controlling channel (PUCCH) and PUSCH, and a format 3A for transmitting a TPC command of a 1 bit-power control for PUCCH and PUSCH, and the like may be given.

The base station divides the CS field allocated in step S1410 into a first group and a second group. Then, when the CS field is a value included in the first group, the base station allocates the CS field so that the plurality of MTC UE map data in a slot or a subcarrier corresponding to the first group. In addition, when the CS field is a value included in the second group, the base station allocates the CS field so that the plurality of MTC UE map data in a slot or a subcarrier corresponding to the second group.

Here, the first and second groups may be divided based on whether the CS field is an even number or an odd number.

Otherwise, in step S1410, the base station may divide a Walsh code instructed by the CS field into a first group and a second group. Then, when the Walsh code is a value included in the first group, the base station may allocate the Walsh code so that a first UE or a second UE maps data in a slot or a subcarrier corresponding to the first group. In addition, when the Walsh code is a value included in the second group, the base station may allocate the Walsh code so that the first UE or the second UE maps data in a slot or a subcarrier corresponding to the second group.

Here, the first group and the second group may be divided based on whether the first group and the second groups are [1 1] or [1 −1] of Walsh code having orthogonality therebetween.

Otherwise, in step S1410, the base station may allocate a slot or a subcarrier of an RB in which each of the plurality of MTC UE maps data in a field of DCI.

For example, by the base station, allocation information that enables a first UE to map data in a slot 0 is included in the field of DCI, and allocation information that enables a second UE to map data in a slot 1 is included in the field of DCI. Otherwise, by the base station, allocation information that enables the first UE to map data in an even number subcarrier is included in the field of DCI, and allocation information that enables the second UE to map data in an odd number subcarrier is included in the field of DCI.

In step S1420, the base station may generate information about a DMRS used for demodulating the data received from the plurality of MTC UE.

Here, the base station may enable a CS value to be included in the information about the DMRS so that the DMRS is defined based on the CS value.

Here, the base station may distinguish the plurality of MTC UE based on the DMRS among the RBs received from each of the MTC UE.

In addition, when generating and transmitting the information about DMRS in which the CS value is included, the base station may enable information for controlling the multiplication of the DMRS defined by the CS value by mutually different Walsh codes to be included in the information about DMRS.

As described above, the base station controls so as to allocate the CS and multiply the DMRS by the Walsh code value, and therefore the MTC UE using the same RB may be multiplexed by maintaining orthogonality of the DMRSs of the plurality of MTC UE.

In step S1430, the base station may transmit, to each of the plurality of MTC UE, position information within the RB which is allocated to each of the plurality of MTC UE in step s1410 and/or information about DMRS generated in step S1420.

Next, in step S1440, the base station may receive, from the plurality of MTC UE, a PUSCH in which data and a DMRS are mapped.

Here, the base station may distinguish plurality of MTC UE based on the DMRS of the RB received from the plurality of MTC UE.

According to an embodiment of the present invention, the MTC UE that can map data in a single RB may be multiplexed for the MTC UE with a small transmission rate, but in the base station, normal reception is possible only when information in which data of each of the MTC UE is positioned within a single RB as described above, is known in advance.

Figure 15:
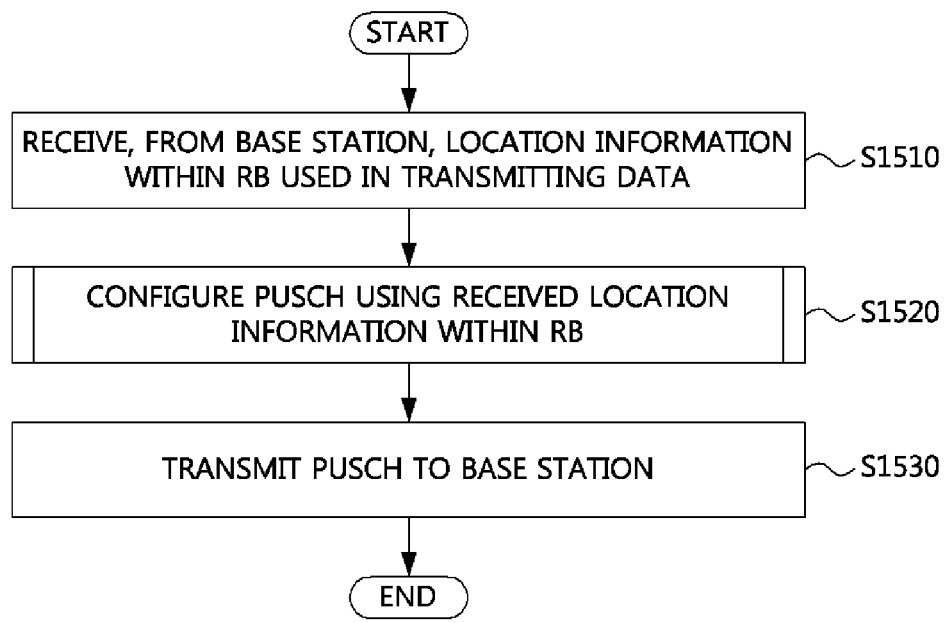
FIG. 15 is a flowchart showing a method of transmitting uplink data in an MTC UE in order to multiplex a plurality of MTC UE according to an embodiment of the present invention.

FIG. 15 is a flowchart showing a method of transmitting uplink data in an MTC UE in order to multiplex a plurality of MTC UE according to an embodiment of the present invention.

Referring to FIG. 15, in step S1510, an MTC UE according to an embodiment of the present invention receives, from a base station, position information within the RB which is to be used in an MTC UE for transmitting uplink data and information about a DMRS used for demodulating uplink data.

Here, the MTC UE may receive, from the base station, information about a DMRS used for demodulating data transmitted to the base station in step S1510.

Next, in step S1520, the MTC UE configures a PUSCH using the position information within the RB and/or information about DMRS received in step S1510.

Next, in step S1530, the MTC UE transmits, to the base station, the PUSCH in which data and/or DMRS is mapped through the PUSCH.

Accordingly, the multiplex capacity of the MTC UE that can be multiplexed in a single RB may be increased, and resources of each MTC UE exist in a part of the single RB, and therefore interference due to signals of other UE may be eliminated.

Hereinafter, a specific process of step S1520 will be described with reference to FIGS. 16 to 18.

Figure 16:
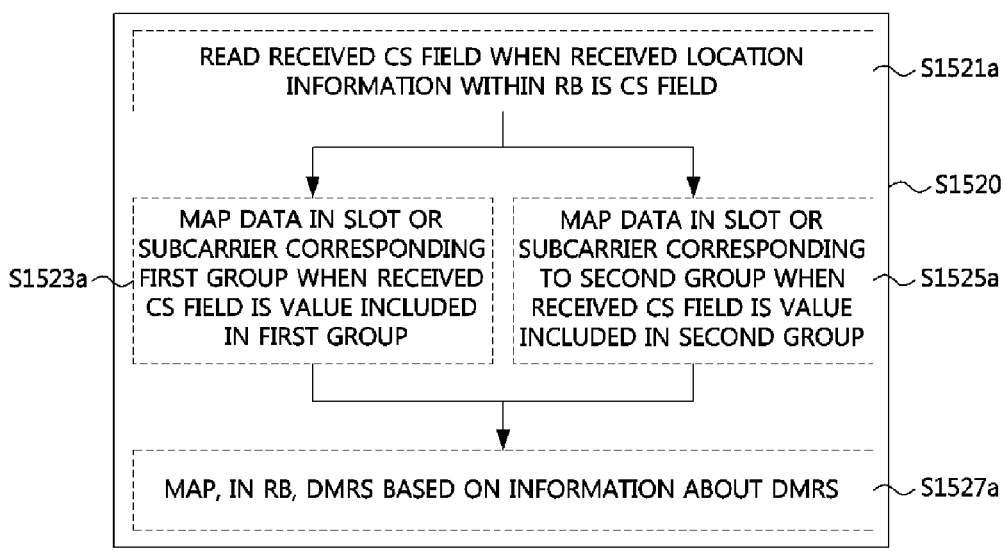
FIG. 16 is a flowchart showing a process of configuring a PUSCH of step S1520 shown in FIG. 15, in more detail.

FIG. 16 is a flowchart showing a process of configuring a PUSCH of step S1520 shown in FIG. 15, in more detail.

Referring to FIG. 16, in step S1521a, when the position information within the RB received in step S1510 is a CS field in a format of DCI, the MTC UE reads the received CS.

In step S1523a, when the CS field is a value included in the first group based on a result of the reading through step S1521a, the MTC UE maps data in a slot or a subcarrier corresponding to the first group.

Otherwise, in step S1525a, when the CS field is a value included in the second group based on a result of the reading through step S1521a, the MTC UE maps data in a slot or a subcarrier corresponding to the second group.

Here, the first group and the second group may be divided based on whether the CS field is an even number or an odd number.

Next, in step S1527a, the MTC UE may map, in an RB, the DMRS that is defined by the information about DMRS received through step S1510.

Here, in the case of MU-MIMO, a maximum of eight CS value may be used, and eight DMRSs in which orthogonality is maintained by each of the CS value may be defined. Accordingly, orthogonality of an MTC UE using a DMRS defined by another CS is ensured, and therefore the number of MTC UE that can be multiplexed in the single RB may be eight.

In addition, in step S1527a, the MTC UE defines a DMRS based on the CS value among the information about DMRS received from the base station in S 1527a, multiplies the defined DMRS by the Walsh code value, and then maps the DMRS in the RB.

Here, when multiplying each DMRS by a Walsh code having a length of 2 ([1 1] or [1−1]) even though the Walsh codes defined by the CS are the same, orthogonality between the MTC UE is ensured, and therefore the number of MTC UE that can be multiplexed in a single RB may be doubled.

In steps S1521a, S1523a, S1525a and S1527a, for convenience of description, steps S1521a, 1523a, and 1525a for mapping data have been first performed, but step S1527a for mapping a DMRS may be first performed, or the steps for mapping data and the step for mapping the DMRS may be simultaneously performed.

The MTC UE according to an embodiment of the present invention may explicitly receive, from the base station, position information in which resources are mapped within the RB, but may implicitly receive position information in which data is mapped within the RB as described above.

Figure 17:
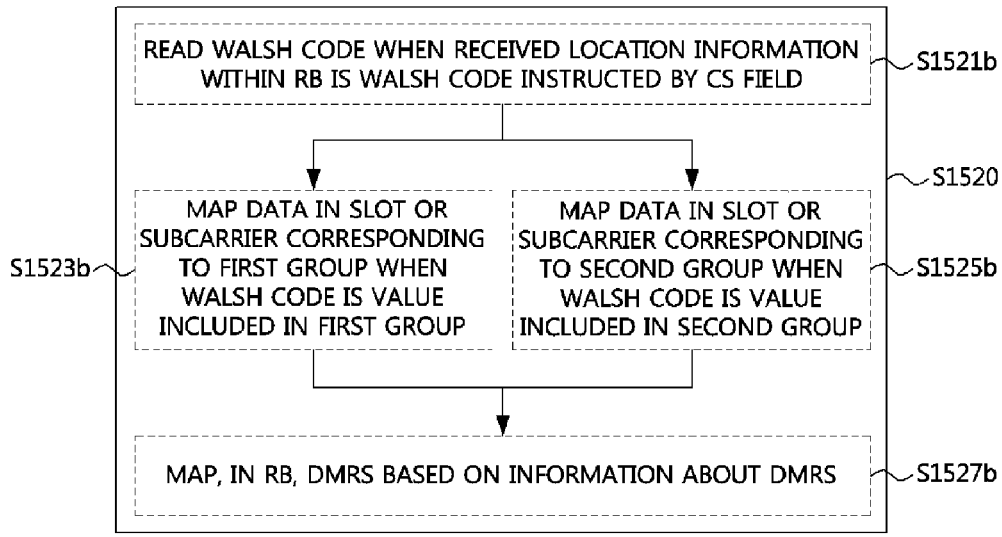
FIG. 17 is a flowchart showing a process of configuring a PUSCH of step S1520 shown in FIG. 15, in more detail.

FIG. 17 is a flowchart showing a process of configuring a PUSCH of step S1520 shown in FIG. 15, in more detail.

Referring to FIG. 17, in step S1521b, when the position information within the RB received through step S1510 is a Walsh code instructed by the CS field received through the DCI, the MTC UE reads the Walsh code.

In step S1523b, when the Walsh code is a value included in a first group based on a result of the reading through step S1521b, the MTC UE maps data of the MTC UE in a slot or a subcarrier corresponding to the first group.

Otherwise, in step S1525b, when the Walsh code is a value included in a second group based on a result of the reading through step S1521b, the MTC UE maps the data of the MTC UW in a slot or a subcarrier corresponding to the second group.

Here, the first group and the second group may be divided in accordance with whether the Walsh code value is [1 1] or [1 −1], each having orthogonality.

Next, in step S1527b, the MTC UE maps, in an RB, a DMRS defined by the information about DMRS received through step S1510.

In addition, in S 1527b, the MTC UE may define a DMRS based on the CS value among the information about DMRS received from the base station, multiply the defined DMRS by the Walsh code value, and then map the DMRS in the RB.

In steps S1521b, S1523b, S1525b and S1527b, for convenience of description, steps S1521b, 1523b, and 1525b for mapping data have been first performed, but step S1527b for mapping a DMRS may be first performed, or the steps for mapping data and the step for mapping the DMRS may be simultaneously performed.

Figure 18:
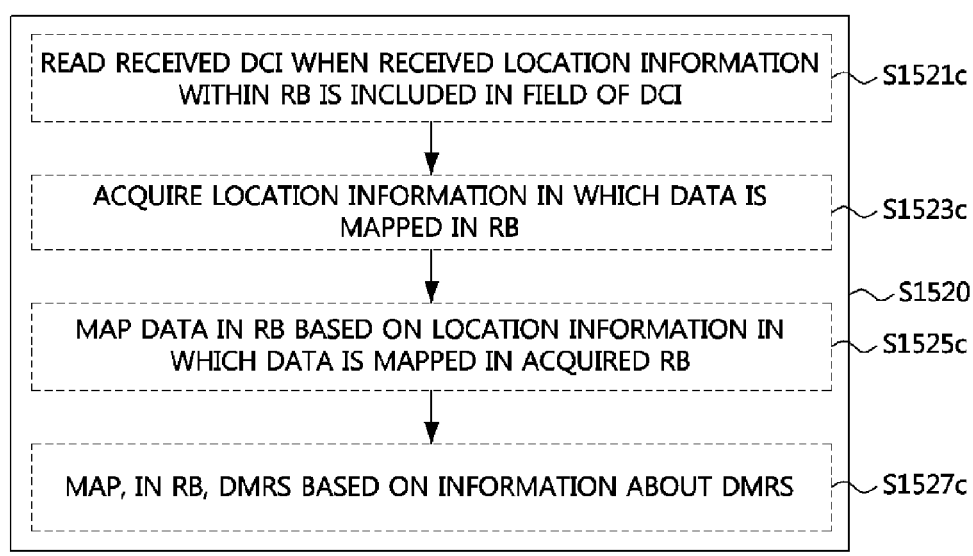
FIG. 18 is a flowchart showing a process of configuring a PUSCH of step S1520 shown in FIG. 15, in more detail.

FIG. 18 is a flowchart showing a process of configuring a PUSCH of step S1520 shown in FIG. 15, in more detail.

Referring to FIG. 18, in step S1521C, when the position information within the RB received through step S1510 is included in a field of DCI, the MTC UE reads the received DCI.

In step S1523c, the MTC UE acquires position information within the RB in which data is mapped through step S1521c. In step S1525c, the MTC UE maps data of the MTC UE in a slot or a subcarrier of the RB in which the acquired data is to be mapped.

Next, in step S1527c, the MTC UE maps, in an RB, a DMRS defined by the information about DMRS received through step S1510.

In addition, in step 1527c, the MTC UE may define the DMRS based on a CS value among the information about DMRS received from the base station, multiply the defined DMRS by the Walsh code value, and then map the DMRS in the RB.

In steps S1521c, S1523c, S1525c and S1527c, for convenience of description, steps S1521c, 1523c, and 1525c for mapping data have been first performed, but step S1527c for mapping a DMRS may be first performed, or the steps for mapping data and the step for mapping the DMRS may be simultaneously performed.

The above-described method is a method of explicitly receiving position information within the RB from the base station. For example, information that instructs the MTC UE to map data in a slot 0 of a single RB using extra fields of DCI which has not yet been defined, or to map data in some parts of subcarriers 0, 3, 6, and 9, may be received.

Figures 19, 20:
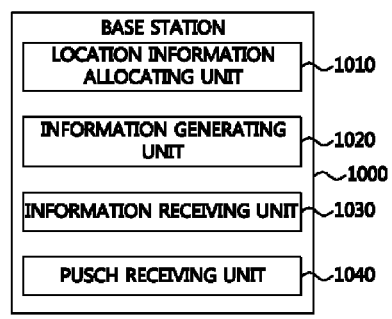
FIG. 19 is a table showing embodiments of the present invention in association with a format of downlink control information (DCI)
FIG. 20 is a block diagram showing a configuration of a base station for allocating wireless resources according to an embodiment of the present invention.

FIG. 19 is a Table showing embodiments of the present invention in association with a format of DCI.

Referring to FIG. 19, "000, 001, 010, 011, 100, 101, 110, and 111" indicate a CS field that is transmitted in a format of DCI using a PDCCH.

The CS field is included in DCI, and $n_{DMRS,\lambda}^{(2)}$ and $[w^{(\lambda)}(0)\ w^{(\lambda)}(1)]$ that are determined in accordance with the CS field are determined.

Here, $\lambda$ denotes a layer, $n_{DMRS,\lambda}^{(2)}$ denotes a user-defined CS in accordance with layers, and $[w^{(\lambda)}(0)\ w^{(\lambda)}(1)]$ denotes a Walsh code value in accordance with layers.

Informing mapping information using the implicit method according to an embodiment of the present invention will be described based on the Table. When the base station transmits "000" of the CS field in a format of DCI, the MTC UE receiving "000" of the CS field may map resources in a slot or a subcarrier corresponding to an even number because "0" of the CS value corresponds to an even number.

Otherwise, in a case in which the base station transmits "101" of the CS field in the format of DCI, when the Walsh code is determined as [1 −1] through "101" of the received CS field, resources may be mapped in a slot or a subcarrier corresponding to [1 −1] of the Walsh code.

FIG. 20 is a block diagram showing a configuration of a base station for allocating wireless resources according to an embodiment of the present invention.

Referring to FIG. 20, a base station 1000 for multiplexing a plurality of MTC UE according to an embodiment of the present invention may include a position information allocating unit 1010, an information generating unit 1020, an information transmitting unit 1030, and a PUSCH receiving unit 1040.

First, the position information allocating unit 1010 allocates position information within an RB, which is used when transmitting data, by each of the plurality of MTC UE.

Specifically, the position information allocating unit 1010 allocates a CS field in a format of DCI.

Here, the position information allocating unit 1010 divides the CS field into a first group or a second group. Here, when the CS field is a value included in the first group, the position information allocating unit 1010 allocates so as to map resources in a slot or a subcarrier corresponding to the first group. When the CS field is a value included in the second group, the position information allocating unit 1010 allocates so as to map resources in a slot or a subcarrier corresponding to the second group.

Here, the first group and the second group may be divided in accordance with whether the CS field is an even number or an odd number.

Otherwise, the position information allocating unit 1010 may allocate the CS field in a format of DCI, divide the Walsh code instructed by the CS field into a first group and a second group, and allocate so as to map data in a slot or a subcarrier corresponding to the first group when the Walsh code value is a value included in the first group. In addition, the position information allocating unit 1010 may allocate so as to map data in a slot or a subcarrier corresponding to the second group when the Walsh code value is a value included in the second group.

Here, the first group and the second group may be divided in accordance with whether the Walsh code is [1 1] or [1 −1] having orthogonality.

Otherwise, the position information allocating unit 1010 may allocate position information within the RB in which each of the plurality of MTC UE maps data in a field of DCI.

For example, the position information allocating unit 1010 may time-divide an RB, and allocate the time-divided RB so that a first MTC UE maps data in a slot 0, and a second MTC UE maps data in a slot 1. Otherwise, the position information allocating unit 1010 may frequency-divide an RB, and allocate the frequency-divided RB so that the first MTC UE maps data in a subcarrier of an even number, and the second MTC UE maps data in a subcarrier of an odd number.

The information generating unit 1020 may provide information about DMRS which is used for demodulating data received from the plurality of MTC UE.

Here, the information generating unit 1020 may enable the CS value to be included in the information about DMRS so that the DMRS is defined based on the CS value. In addition, when the information about DMRS including the CS value is allocated to two MTC UE among the plurality of MTC UE, the information generating unit 1020 may enable information for controlling the multiplication of the DMRS defined by the CS value by the Walsh code value to be included in the information about DMRS.

As described above, the base station 1000 enables information for controlling the multiplication of the DMRS by the CS value and/or the Walsh code value to be included in the information about DMRS, and therefore orthogonality between the MTC UE using the same DMRS may be ensured, thereby multiplexing the MTC UE using a single RB.

The information transmitting unit 1030 transmits, to each of the plurality of MTC UE, the position information within the RB allocated by the information allocating unit 1010 and the information about DMRS generated by the information generating unit 1020.

The PUSCH receiving unit 1040 receives, from the plurality of MTC UE, a PUSCH in which data and the DMRS are mapped.

The MTC UE that maps data in a single RB for MTC UE having a small transmission rate may be multiplexed, but in the base station 1000, normal reception is possible only when information in which data of each of the MTC UE is positioned within a single RB, is known in advance. Accordingly, in the base station 1000, each of the MTC UE transmits the position information within the RB which is used when transmitting data, as described above.

Figure 21:
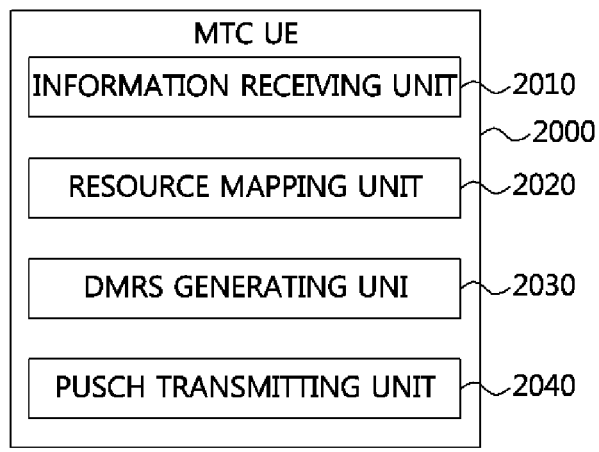
FIG. 21 is a block diagram showing a configuration of an MTC UE for transmitting uplink data according to an embodiment of the present invention.

FIG. 21 is a block diagram showing a configuration of an MTC UE for transmitting uplink data according to an embodiment of the present invention.

Referring to FIG. 21, an MTC UE 2000 may include an information receiving unit 2010, a resource mapping unit 2020, a DMRS generating unit 2030, and a PUSCH transmitting unit 2040.

First, the information receiving unit 2010 receives, from a base station, position information within an RB which is to be used when transmitting data by the MTC UE 2000, and information about a DMRS which is to be used when demodulating data transmitted to the base station by the MTC terminal 2000, and provides the received information to the resource mapping unit 2020 and/or the DMRS generating unit 2030.

The resource mapping unit 2020 configures a PUSCH using the position information within the RB which is provided from the information receiving unit 2010.

Specifically, when the provided position information within the RB is a CS field in a format of DCI, the resource mapping unit 2020 reads the received CS field.

When the CS field is a value included in a first group based on a result of the reading, the resource mapping unit 2020 may map data of the MTC UE 2000 in a slot or a subcarrier corresponding to the first group, and when the CS field is a value included in a second group based on a result of the reading, the resource mapping unit 2020 may map data of the MTC UE 2000 in a slot or a subcarrier corresponding to the second group.

Here, the first group and the second group may be divided in accordance with whether the CS field is an even number or an odd number.

Otherwise, when the provided position information within the RB is a Walsh code instructed by the CS field that is received through the DCI, the resource mapping unit 2020 may read the Walsh code, and when the Walsh code is a value included in the first group based on a result of the reading, the resource mapping unit 2020 may map data of the MTC UE 2000 in a slot or a subcarrier corresponding to the first group. In addition, when the Walsh code is a value included in the second group based on a result of the reading, the resource mapping unit 2020 may map data of the MTC UE 2000 in a slot or a subcarrier corresponding to the second group.

Here, the first group and the second group may be divided in accordance with whether the Walsh code is [1 1] or [1 −1], each having orthogonality.

Otherwise, when the provided position information within the RB is included in the DCI field, the resource mapping unit 2020 may read the DCI to thereby acquire position information in which data is mapped in the RB, and map data of the MTC UE 2000 in a slot or a subcarrier of the RB based on the position information in which the data is mapped in the acquired RB.

The DMRS generating unit 2030 may generate a DMRS based on the information about DMRS provided from the information receiving unit 2010, and map the generated DMRS in the RB.

In addition, the DMRS generating unit 2030 generates the DMRS based on the CS value among the information about DMRS provided from the information receiving unit 2010. The DMRS generating unit 2030 multiplies the generated DMRS by the Walsh code value, and then maps the generated DMRS in the RB. Therefore, even when the DMRSs with another MTC UE 2000 are duplicated, orthogonality may be maintained.

The PUSCH transmitting unit 2040 may transmit, to the base station, a PUSCH in which resources are mapped by the resource mapping unit 2020 and/or the DMRS generating unit 2030.

Figure 22:
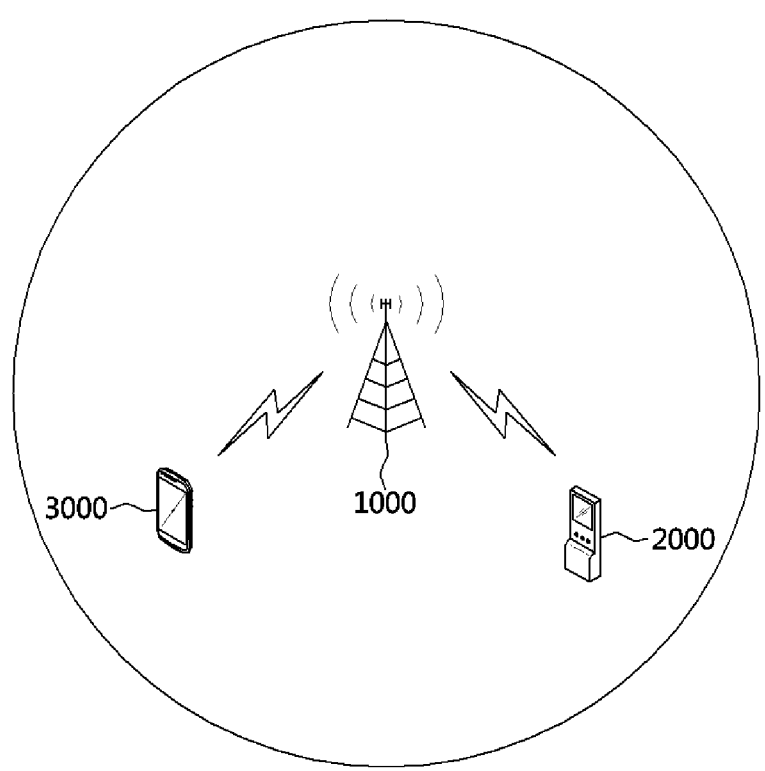
FIG. 22 is a conceptual diagram showing a signal collision problem between an uplink sounding reference signal (SRS) of an LTE terminal and a signal of an MTC UE according to another embodiment of the present invention.

FIG. 22 is a conceptual diagram showing a signal collision problem between an uplink sounding reference signal (SRS) of an LTE terminal and a signal of an MTC UE according to another embodiment of the present invention.

Referring to FIG. 22, an SRS of an LTE terminal 3000 and a signal of an MTC terminal 2000 use the same frequency bandwidth, and therefore a collision may occur.

Hereinafter, a method of avoiding signal collision between the SRS of the LTE terminal 3000 and the signal of the MTC terminal 2000 will be described.

Here, the SRS is a signal that is transmitted to an uplink so that a network can estimate quality of an uplink channel in other frequencies, and it is unnecessary that the SRS should be transmitted together with other physical channels. When the SRS is transmitted together with the PUSCH, the SRS is transmitted in frequencies different from a position to which the PUSCH is transmitted, and transmitted generally in a frequency wider than a bandwidth of the PUSCH.

First, the base station 1000 may control SRS scheduling of the LTE terminal 3000 so that collision between the signal of the MTC UE 2000 and the SRS of the LTE terminal 3000 does not occur.

Otherwise, when it is determined that the risk of collision between the signal of the MTC UE 2000 and the SRS of the LTE terminal 3000 exists, the MTC UE 2000 may perform puncturing on a last symbol of the signals transmitted by the MTC UE 2000. Therefore, the LTE terminal 3000 may transmit the SRS without any collision.

Here, the MTC UE 2000 is aware of in which sub-frame the LTE terminal 3000 transmits the SRS, and therefore the MTC UE 2000 may determine whether the risk of collision between the signal of the MTC UE 2000 and the SRS of the LTE terminal 3000 exists.

Otherwise, when the SRS on which scheduling is performed is duplicated with a frequency bandwidth used by the MTC UE 2000, the LTE terminal 3000 may control (?) so as not to transmit the SRS of the LTE terminal 3000 to the base station 1000.

As described above, in the method of transmitting uplink data according to the embodiments of the present invention, position information within the RB in which the MTC UE maps data is received from the base station, data is mapped in the RB using the received position information within the RB, and then data is transmitted to the base station through the PUSCH.

Accordingly, the plurality of MTC UE may multiplex a single RB to thereby increase multiplex capacity of the MTC UE. In addition, data may exist in a part of a single RB, and therefore interference with signals of other UE may be eliminated.

While the example embodiments of the present invention and their advantages have been described in detail, it should be understood that various changes, substitutions and alterations may be made herein without departing from the scope of the invention.

What is claimed is:

1. A method of allocating a wireless resource in a base station, comprising:
   allocating, for each of a plurality of user equipment (UE), position information within a resource block (RB), which is used when transmitting uplink data, to the RB;
   generating information about a pilot signal used when demodulating the data received from the plurality of UE; and
   transmitting the position information within the RB and the information about the pilot signal to each of the plurality of UE,
   wherein the pilot signal is defined based on a cyclic shift (CS) value among the information about the pilot signal, multiplied by a Walsh code value, and mapped in the RB based on the position information.

2. The method of claim 1, wherein the allocating of the position information allocates a cyclic shift field in a format of downlink control information (DCI), divides the allocated cyclic shift field into a first group or a second group, and allocates the resources so as to map the data in a slot or a subcarrier corresponding to each group.

3. The method of claim 2, wherein the first group and the second group are divided in accordance with whether the cyclic shift field is an even number or an odd number.

4. The method of claim 1, wherein the allocating of the position information allocates a cyclic shift field in a format of DCI, divides a Walsh code instructed by the allocated cyclic shift field into a first group and a second group, and allocates the resources so as to map data of the UE in a slot or a subcarrier corresponding to each group.

5. The method of claim 4, wherein each of the first group and second group is the Walsh code having mutual orthogonality.

6. The method of claim 1, wherein the allocating of the position information allocates, to a field of DCI, information about a slot or a subcarrier of the RB in which each of the plurality of UE maps the data.

7. A method of transmitting uplink data in an UE, comprising:
- receiving, from a base station, position information within an RB used when transmitting uplink data, and information about a pilot signal used when demodulating the uplink data;
- configuring a uplink data channel using the received position information within the RB and information about the pilot signal; and
- transmitting the configured uplink data channel to the base station,
- wherein the configuring of the uplink data channel includes defining the pilot signal based on a cyclic shift (CS) value among the received information about the pilot signal, multiplying the defined pilot signal by a Walsh code value, and mapping the pilot signal in the RB.

8. The method of claim 7, wherein the configuring of the uplink data channel includes
- reading a cyclic shift field when the received position information within the RB is the cyclic shift field in a format of DCI; and
- dividing the cyclic shift field into a first group or a second group based on a result of the reading, and mapping data of the UE in a slot or a subcarrier corresponding to each group.

9. The method of claim 8, wherein the first group and the second group are divided in accordance with whether the cyclic shift field is an even number or an odd number.

10. The method of claim 7, wherein the configuring of the uplink data channel includes
- reading a Walsh code when the received position information within the RB is the Walsh code instructed by the cyclic shift field received through the DCI; and
- dividing the Walsh code into a first group or a second group based on a result of the reading, and mapping data of the UE in a slot or a subcarrier corresponding to each group.

11. The method of claim 10, wherein each of the first group and second group is the Walsh code having mutual orthogonality.

12. The method claim 7, wherein the configuring of the uplink data channel includes
- reading the received DCI when the received position information within the RB is included in a field of DCI;
- acquiring position information in which data is mapped in the RB based on the reading; and
- mapping data of the UE in a slot or a subcarrier of the RB based on the acquired position information in which the data is mapped in the RB.

13. A user equipment (UE) comprising:
- an information receiving unit that receives, from a base station, position information within an RB used when transmitting uplink data, and information about an pilot signal used when demodulating the uplink data;
- a resource mapping unit that maps the data in a data transmission symbol of a uplink data channel using the position information within the RB provided from the information receiving unit;
- a pilot signal generating unit that generates a pilot signal of the uplink data channel using the information about the pilot signal provided from the information receiving unit; and
- a uplink data channel transmitting unit that transmits the data mapped by the resource mapping unit and the pilot signal generated by the pilot signal generating unit,
- wherein the pilot signal generating unit generates the pilot signal based on a CS value among the information about the pilot signal, and multiplies the generated pilot signal by a Walsh code value.

14. The UE of claim 13, wherein the pilot signal generating unit maps, in the RB, the pilot signal defined by the information about the received pilot signal.

* * * * *